United States Patent [19]
Johnson et al.

[11] 3,884,945
[45] May 20, 1975

[54] SYNTHESIS OF STEROIDS BY CYCLIZATION IN NITRO SOLVENTS

[75] Inventors: William S. Johnson, Portola Valley; Douglas R. Morton, Palo Alto, both of Calif.; Michael B. Gravestock, Worthing, England

[73] Assignee: The Board of Trustees of Leland Stanford Junior University, Stanford, Calif.

[22] Filed: Apr. 26, 1973

[21] Appl. No.: 354,532

[52] U.S. Cl. ..... 260/397.3; 260/397.45; 260/397.47
[51] Int. Cl.² ........................................ C07C 169/22
[58] Field of Search ....... Machine Searched Steroids Primary Examiner—Elbert L. Roberts

[57] ABSTRACT

Synthesis of steroids by cyclization of a dienyne cyclization substrate to a steroid or A-nor steroid employing a primary or secondary aliphatic nitro compound as solvent, thereby forming an oxime ether group at the C-17 position of the resulting steroid (or at the corresponding position of the resulting A-nor steroid where that is the product of cyclization). This oxime group can be converted to an hydroxy group by reductive cleavage. Conversion of the cyclization products to steroids such as 17-hydroxypregnan-20-ones and testosterone is facilitated. The method is also applied to cyclization of suitable substrates to bicyclic products.

5 Claims, No Drawings

SYNTHESIS OF STEROIDS BY CYCLIZATION IN NITRO SOLVENTS

The invention described herein was made in the course of work under grants or awards from the Department of Health, Education and Welfare and the National Science Foundation.

This invention relates to the synthesis of steroids by a cyclization process in which a cyclization substrate having an open chain structure including an acetylenic group at one end of the chain, two intermediate trans olefinic groups and a cyclization initiator (which may be cyclic or acyclic) at the other end of the chain is caused to undergo cyclization to form a tetracyclic product which, depending upon the cyclization initiator, is a steroid or an A-nor steroid. As will appear the invention is also applicable to substrates which can be cyclized to bicyclic products.

It is known that the condensation of certain aldehydes with certain ylides produces a substrate which is a dienyne and has the general formula and steric configuration:

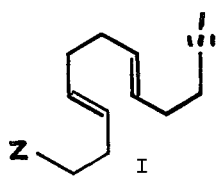

I wherein some one or more of the carbon atoms of the dienyne group shown attached to Z may be substituted, for example by methyl; the methyl group shown attached to the acetylenic group may be another group such as ethyl or trimethyl silyl; and Z is a cyclization initiator such as one of those shown in Table 1 below. It is also known that this type of substrate can be cyclized in a suitable solvent in the presence of a strong protonic acid such as trifluoroacetic acid or a Lewis acid such as stannic chloride to afford a tetracyclic product which may be a normal steroid having a six-membered A-ring or which may be an A-nor steroid having a five-membered A-ring, depending upon choice of Z. See for example Johnson and Gravestock, U.S. Pat. application, Ser. No. 162,672 filed July 14, 1971 entitled Steroid Total Synthesis, now abandoned. See also Johnson, Gravestock and McCarry, J. Amer. Chem. Soc. (hereinafter) J.A.C.S.) 93 4332 (1971) and Johnson, McCarry and Markezich, J.A.C.S. 95, 4416 (1973). See also Johnson, Gravestock, Parry, Myers, Bryson & Miles, J.A.C.S. 93, 4330 (1971) as to cyclization of certain substrates to bicyclic products.

TABLE I

| Cyclization Initiator Z | Steroid Resulting from Cyclization |
|---|---|
| (1) 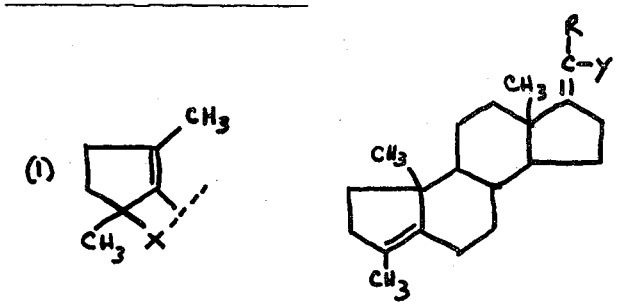 | |
| (2) 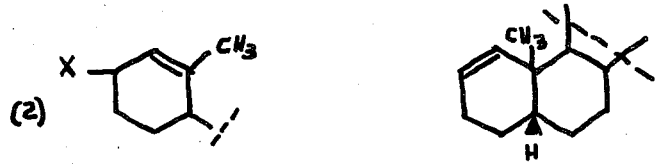 | |
| (2a) 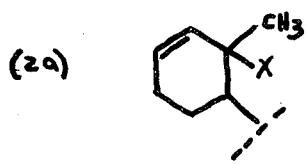 | Same as (2) above |
| (3) 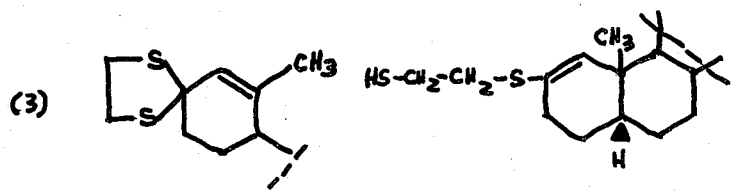 | |

TABLE 1 (Cont'd)
| Cyclization Initiator Z | Steroid Resulting from Cyclization |
|---|---|
| (4) 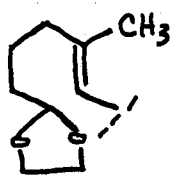 | 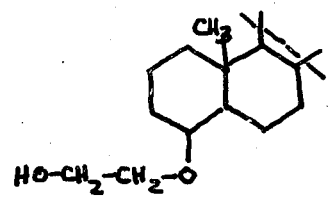 |
| (5) 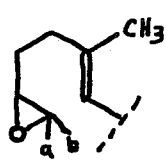 | 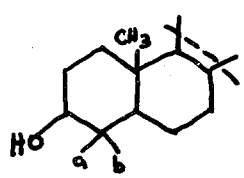 |
when a = CH$_3$, b = CH$_3$
when a = H, b = C$_6$H$_5$
| | |
|---|---|
| (6) 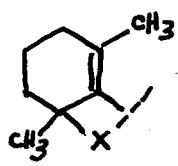 | 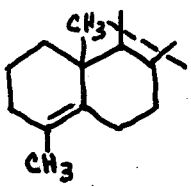 |
| (7) 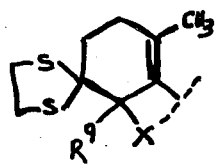 | 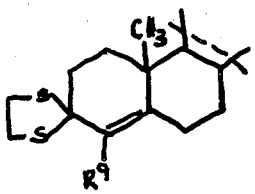 |
R$^9$ = H or CH$_3$
| | |
|---|---|
| (8) 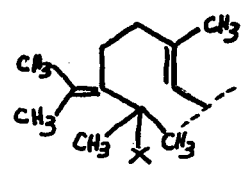 | 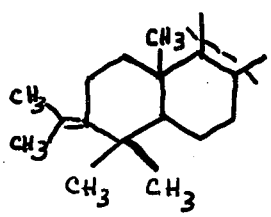 |
| (9) 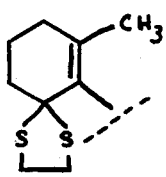 | 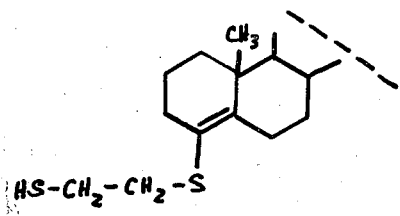 |

In Table I any of the methyl groups shown may be replaced by hydrogen or higher alkyl (e.g. ethyl or benzyl) and R may be methyl or higher alkyl (e.g. ethyl), benzyl or protected hydroxymethyl. X may be hydroxyl, substituted hydroxyl such as methoxyl or ethoxyl, chlorine, bromine, also iodine (which, however, is difficult to introduce) or F (which is difficult to remove). In the left hand column of Table I the short solid line extending to the lower right and terminating at a dashed line is the link to the remainder of the molecule. In the right hand column, the balance of the molecule (to the right of the dashed line) is omitted in items (2) to (7); it is the same as or very similar to that of the product of the cyclization initiator (1). In the thioketal group the linking group between the sulfur atoms may be $-(CH_2)_n-$ where n is an integer, e.g. 2–10; likewise in the ketal group.

Typical of these cyclization reactions are the following:

For the sake of simplicity, the conventional wedges (to indicate the β-configuration) and dotted line (to indicate the α-configuration) at positions such as C-5, C-10, etc. are omitted and it will be understood that the placement of H, $CH_3$ etc. at these positions is as in the natural steroids, the exception being that in those instances where the C-5 hydrogen or substituent is in the β-configuration it is so indicated. In general, the steric configurations at C-17 is also shown, as in Flow Sheets Nos. 1, 2 and 3.

It will be seen that the terminal group at the C-17 positions of 4 and 6 (and in the corresponding position in the A-nor steroid 2) is a vinyl group as in 2 and 6 or an acyl group as in 4. The presence of this group introduces difficulties in certain subsequent operations on the steroid product to convert it to a desired steroid product such as a 17-hydroxypregnan-20-one or testosterone. For example, if it is desired to employ the steroid 4 as a precursor for testosterone thus

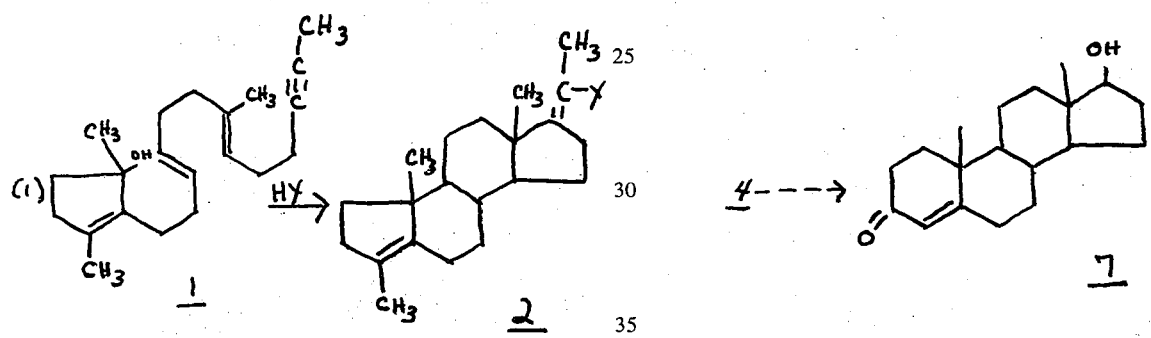

(HY = trifluoroacetic acid)

or as a precursor to a 17-hydroxypregnan-20-one thus

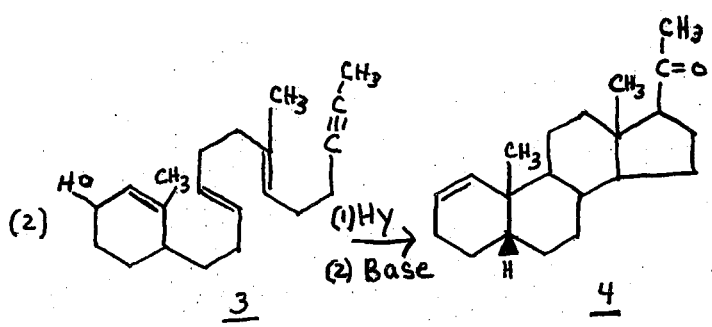

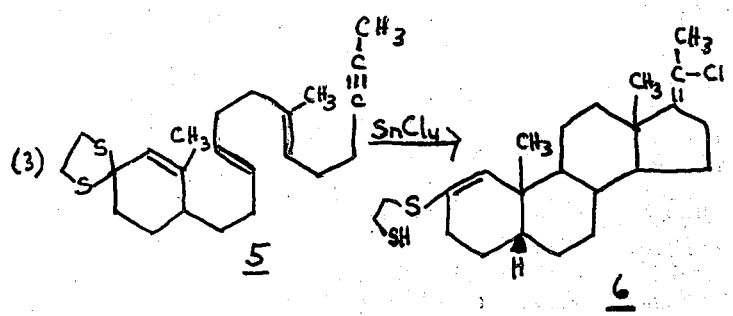

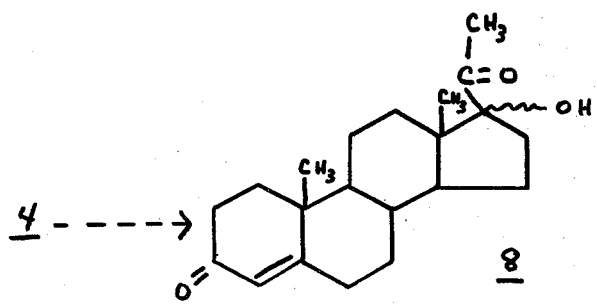

it is necessary to protect the Δ¹-olefinic group of 4 from oxidation. Other difficulties are also encountered in the conversion of steroids 4 and 6 as well as certain other cyclization products to the desired end products owing to the destructive effects of some of the required reagents on sensitive groups.

It is an object of the present invention to provide improvements in the synthesis of steroids by the cyclization procedure described above and in the cited patent and scientific literature.

It is a particular object of the present invention to provide a method whereby the pendant group attached to the five-membered ring derived from the acetylenic group of the substrate and resulting from its cyclization (which in the case of a normal steroid is at the C-17 position) is more amenable to alteration to facilitate the synthesis of certain desired steroids such as 17-hydroxypregnan-20-ones and testosterone.

The above and other objects will be apparent from the ensuing description and the appended claims.

We have discovered that, if the cyclization reaction typified by equations (1), (2), and (3) above is carried out in a solvent which is, or which includes as a substantial component, an aliphatic nitro compound having at least one hydrogen attached to the carbon atom to which the nitro group is attached, an oxime ether is formed as follows:

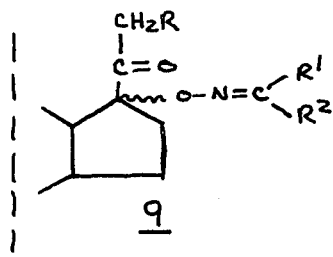

In partial formula 9 R may be hydrogen; lower alkyl such as $C_1$ to $C_4$ alkyl e.g. methyl or ethyl; aryl such as phenyl; halogen such as Cl or Br; or a protected hydroxy group such as methoxyl, higher alkoxyl, acyloxy such as acetoxy or generally the group —OCO.R' wherein R' may be $C_1$ to $C_4$ alkyl, phenyl, etc. or R may be a carbonate group —OCO.OR' wherein R' is as defined above. R¹ and R² are derived from the nitro aliphatic compound and are as defined below. In the partial formula 9 the remainder of the molecule (to the left of the five-membered ring) is omitted. The omitted portion may comprise a single ring fused with the five-membered ring as in Example 1 below or it may comprise three fused rings as in the steroids 2, 4, and 6 above.

We have further found that the oximes 9 lend themselves advantageously to conversion to other useful substances and (where they are tetracyclic substances,) to very useful products such as 17-hydroxypregnan-20-ones and testosterone. Such conversions are considerably more facile than the conversion of similar cyclization products wherein the group attached to the five-membered D-ring at the C-17 position (or at the analogous position in an A-nor steroid) is other than the acyl-oxime group shown in 9.

This method--the use as a solvent of an aliphatic nitro compound having the group

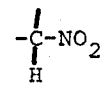

may be applied to any of the cyclization procedures and cyclization substrates described in the literature and patent references cited above. Examples of cyclization initiators Z are set forth in Table I. Conditions of cyclization may be any of those which are described in the aforesaid literature and patent references or as described below, with the proviso that the solvent be, or that it contain a substantial proportion of, an aliphatic nitro compound as described above. The proportion of aliphatic nitro compound in the solvent is preferably 50% by weight or more, most advantageously 70% by weight or more. Higher proportions of aliphatic nitro compound result in better yields. Co-solvents such as dichloromethane; 1,2-dichloroethane; other chlorocarbons; 1,1-difluoroethane; other fluorocarbons; and in general any liquid which is inert to the cyclization reaction and in which the aliphatic nitro compound is soluble may be used.

The aliphatic nitro compound may be any of the primary or secondary nitro alkane series such as nitromethane, nitroethane, symmetrical and unsymmetrical nitro propanes; any of the various primary and secondary $C_4$ to $C_{12}$ nitro alkanes, etc.; also cycloaliphatic nitro aliphatic compounds provided the carbon atom attached to the nitro group is a secondary carbon atom having a hydrogen atom attached thereto such as nitrocyclohexane nitrocyclopentane, nitrocyclopropane, etc. The alkyl or cycloaliphatic group may be substituted by non-aliphatic groups and by hetero atoms and functional groups which do not interfere with formation of the oxime 9 and with the cyclization reaction. Examples of non-aliphatic substituents are phenyl (e.g. phenyl nitro methane), substituted phenyl (e.g. substituted by alkyl or halogen). The aliphatic groups may have unsaturation. Mixtures of two or more aliphatic nitro compounds may be used. Unsubstituted low molecular weight nitro alkanes such as nitromethane, nitroethane and the nitropropanes are preferred because they are inexpensive, they are liquid at the reaction temperatures and the excess is easily removed because the solvent is volatile.

Examples 1, 2 and 3 below illustrate the method of the present invention as applied to a bi-cyclic synthesis (Examples 1) a tetracyclic synthesis leading to an A-nor steroid (Example 2), and a tetracyclic synthesis leading to a normal steroid (Example 3).

EXAMPLE 1

A solution of the tertiary alcohol 10 (see Johnson et al., J.A.C.S. 93, 4330 (1971))

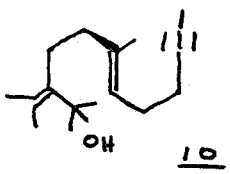

10 contaminated with 12.5% of the isomeric homoallylic alcohol, was treated in dry nitroethane at −78° with excess trifluoroacetic acid, followed by aqueous sodium bicarbonate workup. This resulted in essentially complete conversion of 10 with predominant formation of the epimeric oxime ethers 11

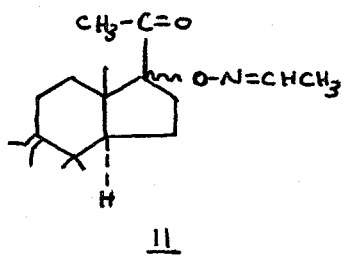

11 in about 80% yield of a 1:1 mixture of α-acetyl: β-acetyl isomers by vapor phase chromatography. A sample was purified by preparative tlc on silica gel (1:9 EtOAc-hexane) to afford 11 (purity > 97%, by vpc). The mass spectrum showed a parent peak at m/e 305 (M+), and the infrared spectrum (liquid film) showed maxima at 1715 (C=O) and 1635 (C=N) cm$^{-1}$. The nmr spectrum of a chromatography fraction enriched in the α acetyl-epimer included singlets at δ 1.07 (3H) and 1.20 (6H) for the three methyl groups attached to quaternary carbon atoms, and at 1.66 (3h) and 1.80 (3H) for the isopropylidene methyl groups. In addition, there was a singlet at 2.07 (3H, acetyl methyl), a doublet ($J$=6Hz) at 1.90 (3H, N=CHCH$_3$), and a quartet ($J$=6 Hz) at 6.83 (1H, N=CHCH$_3$). Analytical samples of 11 are difficult to obtain but degradation to a more readily purified product and analysis of the products of degradation established the structure 11. Details will be found in a paper by Morton and Johnson, J.A.C.S. Vol 95, p. 4419 (1973) entitled "Acetylenic Bond Participation in Biogenetic-Like Olefinic Cyclizations. Cyclizations in Nitroalkane solvents."

EXAMPLE 2

Cyclization of 1 in nitroethane followed by purification by preparative tlc on silica gel (4:6 EtOAc-pentane) and evaporative distillation, yielded a 55:45 mixture of β-acetyl: α-acetyl oxime ethers 12 in ca. 30% yield (purity > 95%, by vpc); mass spectrum m/e 357 (M+). The infrared and nmr spectra were similar to those for 11 and were in complete accord with structure 12.

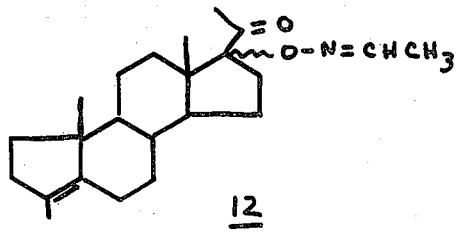

12

EXAMPLE 3

Treatment of a solution of 3 in dry 2-nitropropane with trichloroacetic acid, followed by aqueous sodium bicarbonate workup and purification by preparative tlc on silica gel (1:99 EtOAc-hexane: continuous elution for 4 hr) gave the isomeric oxime ethers 13 in 45% yield (ca. 1:1 mixture of 17-α-acetyl: 17β-acetyl isomers by nmr). Evaporative distillation (190° at 0.01 mm) afforded an analytically pure sample (Anal. Found: C, 77.8; H, 10.0; N, 3.7); $\nu_{max}^{CCl_4}$ 1712 (C=O), 1639 (C=N) cm$^{-1}$. The nmr spectrum (60 MHz, CCl$_4$, TMS internal standard) included singlets at δ 0.58 (3H, C-18 of β-acetyl isomer), 0.93 (3H, C-18 of α-acetyl isomer), 0.99 (6H, Cl-19, both isomers) and at 1.86 (3H), 1.88 (3H), 1.92 (3H), and 1.94 (3 H) for the methyl groups adjacent to the carbonyl and oxime groups. In addition there were two singlets at 5.48 and 5.52 (2H total) for the olefinic protons.

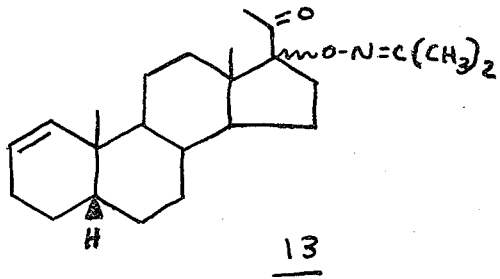

13

The oxime ethers 11 (Example 1), 12 (Example 2) and 13 (Example 3) are mixtures of isomers whose separation is very difficult. However in certain instances, as in the case of conversion of 13 to testosterone, the pendant groups at C-17 are replaced by a symmetrical group or atom which does not have the possibility of isomers, hence difficulty in separation of the oxime ether isomers is of no importance; and even in those cases (such as conversion of 13 to 17-hydroxypregnan-20-one) the resulting isomer mixtures are useful or if a pure species such as 17-α-hydroxypregnan-20-one is desired, separation or enrichment can be effected by chromatography.

Flow Sheet 1 illustrates the manner in which the tetracyclic oxime ether of Example 3 may be converted to a mixture of isomeric 17-hydroxypregnan-20-ones and Flow Sheet 2 illustrates how the same oxime ether may be converted to testosterone. Example 4 gives details concerning the steps of Flow Sheet No. 1 and Example 5 gives details concerning the steps of Flow Sheet No. 2. Flow Sheet No. 3 illustrates how the bicyclic oxime ether 11 can be converted to a ketone.

FLOW SHEET NO. 1
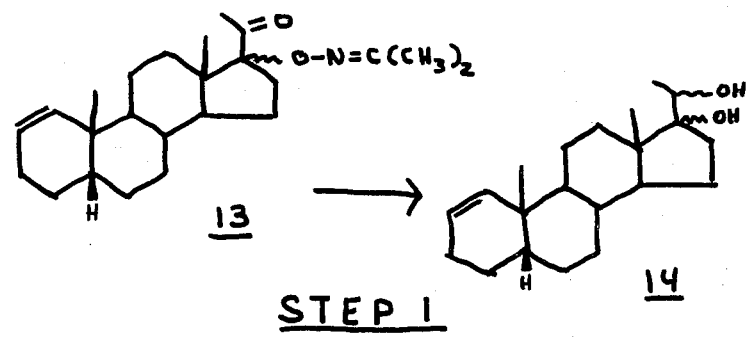
STEP 1
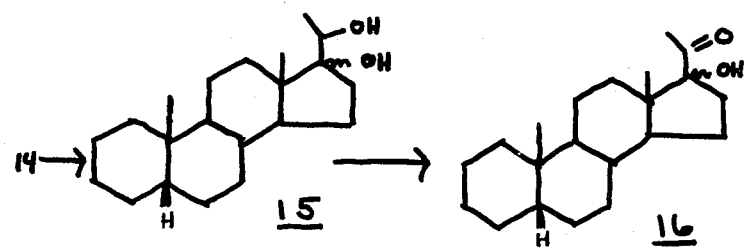
STEP 2      STEP 3
Mixture of 17-α and 17-β-hydroxy-5β-pregnan-20-ones
FLOW SHEET NO. 2
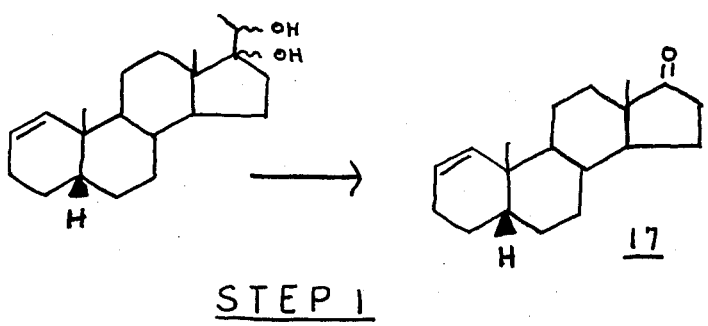
STEP 1
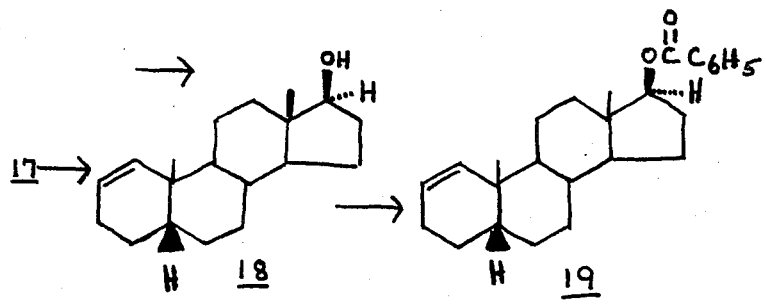
STEP 2      STEP 3

FLOW SHEET NO. 2 (Cont'd)
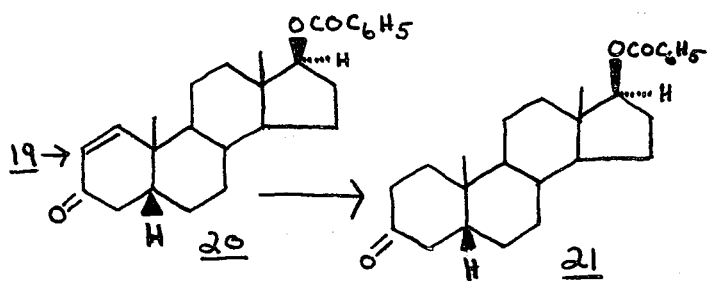
STEP 4          STEP 5
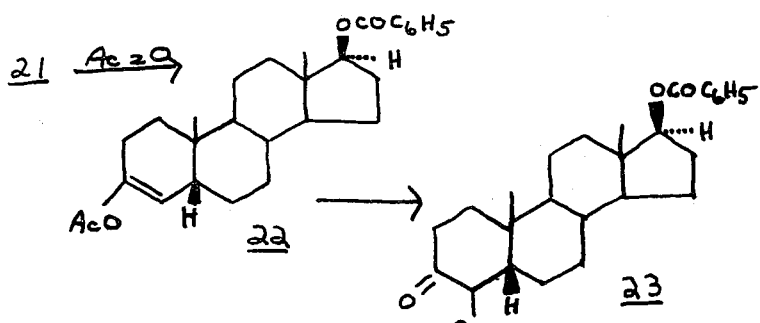
STEP 6          STEP 7
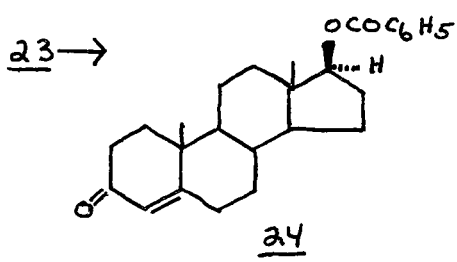
STEP 8    Testosterone Benzoate
FLOW SHEET NO. 3
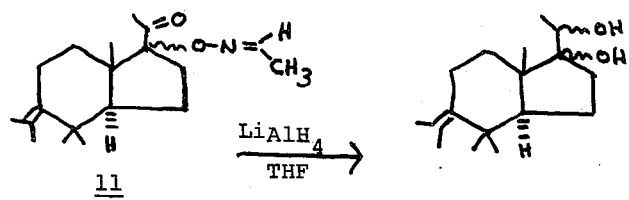
4 possible stereoisomers
25
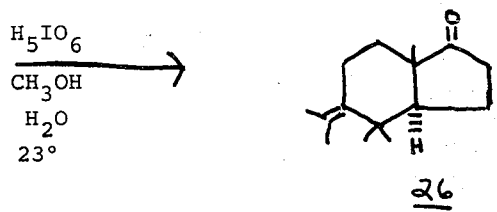

EXAMPLE 4

Conversion of Oxime Ether 13 to a Mixture of 17-α and 17-β hydroxypregnan-20-ones Step 1 (reduction of the oxime ether 13 to the glycol 14) was carried out with excess lithium aluminum hydride in refluxing tetrahydrofuran in an atmsosphere of nitrogen, which cleaved the N-O bond and also reduced the carbonyl group. 14 is a mixture of four stereoisomers which were identified (as a mixture) by nmr and infrared spectra. In Step 2 the Δ¹ olefinic bond of 14 was reduced by hydrogenation with palladium on activated carbon in ethyl acetate at 23° to afford the diol 15 which was oxidized in Step 3 by N-bromosuccinimide to afford 16 which is a mixture of two stereoisomers of which 17-α-hydroxy-5β-pregnan-20-one is one of the isomers.

EXAMPLE 5

Conversion of Oxime Ether 13 to dl-testosterone Benzoate

In Step 1 (oxidative cleavage of the vicinal diol group), the diol 14 was treated with periodic acid in methanol-water at 23° under nitrogen for 14 hours to afford the ketone 17 which, in Step 2, was reduced by sodium borohydride in ethanol at 23° under nitrogen to afford the alcohol 18 which was converted in Step 3 to its benzoate 19 by means of benzoyl chloride in pyridine at 25°. The C-3 position was oxidized in Step 4 to afford the ketone 20 by treatment with t-butyl chromate in acetic acid, and acetic anhydride and tetrachloroethylene under nitrogen at 85°–95° for three-fourths hours. The Δ¹-olefinic bond was reduced in Step 5 by hydrogen and palladium on activated carbon in ethyl acetate at 24° to afford the ketone 21 which was converted to the enol acetate 22 by acetic anhydride in the presence of perchloric acid in ethyl acetate at 23° for 10 minutes under nitrogen. The enol acetate 22 was treated with bromine in carbon tetrachloride and epichlorhydrin at 0° under nitrogen to afford the bromoketone 23. The bromoketone 23 was treated with semicarbazide hydrochloride which resulted in an intermediate (α, β-unsaturated semicarbazone not shown in Flow Sheet 2) which was hydrolyzed with aqueous pyruvic acid to afford dl-testosterone benzoate 24.

GENERAL DISCUSSION

It will be seen that a new class of polycyclic substances is provided in which an oxime ether group is attached at the C-17 position (and at the corresponding positions of an A-nor steroid and of a bicyclic product) which class of compounds has the formula 9

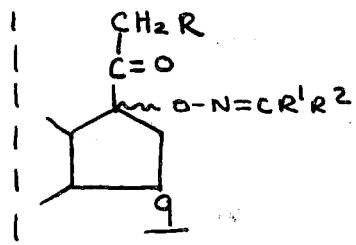

In this formula, the portion of the molecule to the left of the dashed line is omitted and, together with the five-membered ring shown, may provide a steroid, an A-nor steroid or a bicyclic product. This results from cyclization of a substrate which may be a trans mono-or dienyne. This class of oxime ethers lends itself to conversion, first by reductive cleavage to a glycol 27

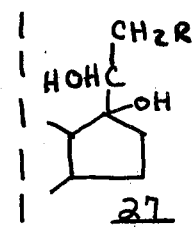

and then to derivatives in which the glycol group is degraded to a keto group 28, thus

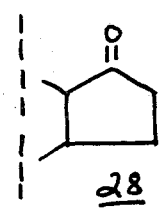

or to a hydroxyketone group 29, thus

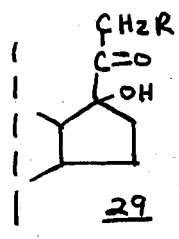

These derivatives may then be converted by known steroid conversion reactions such as those illustrated in Flow Sheets Nos. 1 and 2 to more useful products such as testosterone, 17-hydroxypregnan-20-ones, etc. As described in Johnson, Markezich and McCarry, U.S. Patent application Ser. No. 281,380, the ylides which are condensed with aldehydes may be produced in optically active form by resolution of an acid which in turn is derived from an ester intermediate in the synthesis of the ylide. If an optically active ylide, e.g., the d form, is provided in such manner and is condensed with an aldehyde, the cyclization substrate I will be optically active and the resulting steroid will also be optically active rather than a racemic mixture.

The conversion of the glycol 27 and the hydroxy ketones 29 to desired end products may be carried out by standard conversion techniques which are well known in steroid chemistry and which are exemplified in Flow Sheets 1 and 2 and Examples 4 and 5.

Typical of such conversion techniques are reduction of an olefinic group such as the Δ¹-olefinic group of 14 by catalytic hydrogenation; oxidation of a C-20 hydroxyl group to a keto group by N-broms succinimide; cleavage of the stereoisomeric diol mixture (as in 14) to a product having a C-17 keto group (as in 17); protection of a sensitive alcohol group by forming the ester as in the case of 18 → 19 (Step 3 of Flow Sheet No. 2). In some cases an ester is more easily crystallized. Further examples are oxidation of the C-3 position to a keto group with tert.-butyl-chromate (as in Step 4 of Flow Sheet No. 2); reduction of a Δ¹-olefinic group as in the conversion of 20 to 21 in Step 5 of Flow Sheet 2 by catalytic hydrogenation; and the introduction of a Δ⁴-olefinic group into the A-ring of a steroid while protecting the C-3 keto group as in Steps 6, 7, and 8 of Flow Sheet 2 by bromination-dehydrobromination.

As stated above one or more of the hydrogen atoms in the dienyne segment of the molecule of I may be substituted, e.g. by methyl or ethyl. An example is the method described in Johnson and Gravestock U.S. Pat. application, Ser. No. 375,617, filed July 2, 1974 wherein the aldehyde which is condensed with the ylide to produce the cyclization substrate I is homologue typically prepared as follows:

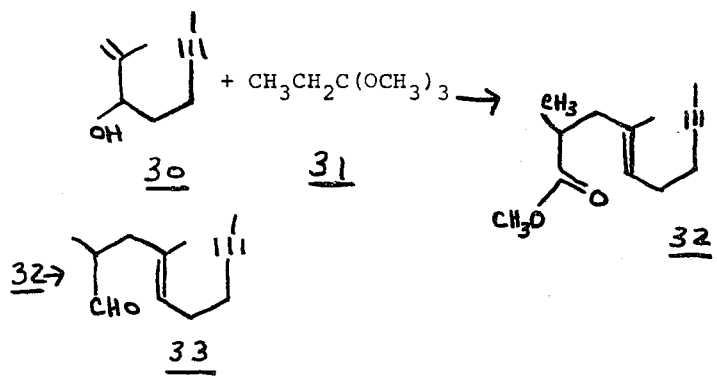

The aldehyde 33 may be condensed with any of the ylides described in the patent and literature references referred to in the second paragraph of this specification to produce cyclization substrate 34

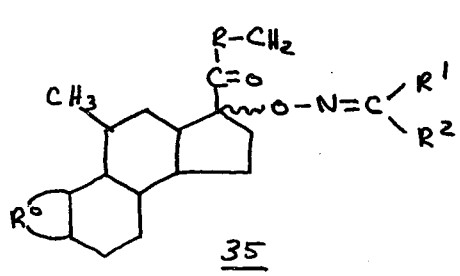

which, on cyclization in a solvent of the type described herein, produces a steroid (or an A-nor steroid)

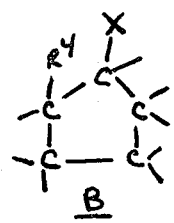

wherein R⁰ is derived from Z. The methyl group shown (which is at the C-11 position if 35 is a normal steroid) may, instead, be a higher alkyl radical, e.g. ethyl or propyl, if there is used a higher homologue such as $CH_3)CH_2)_2 C(OCH_3)_3$ in place of trimethyl orthopropionate.

We claim:

1. In the method of cyclizing a substrate having in its molecule the skeletal structure A

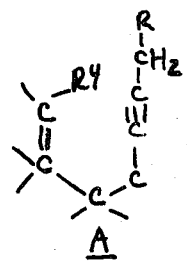

to produce a cyclizatiin product having in its molecule the skeletal structure B

wherein R selected from the class consisting of hydrogen, lower alkyl, aryl, halogen and protected hydroxyl; R⁴ is H or lower alkyl and X is a group derived from R—CH₂—C≡ , the improvement which comprises conducting the cyclization in a solvent which contains at least a major proportion of a primary or secondary aliphatic nitro compound or mixture thereof, thereby forming a cyclization product having in its molecule the skeletal structure C

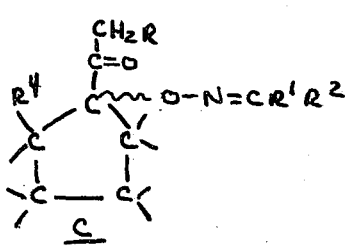

wherein R¹ and R² are monovalent groups or a single bivalent group derived from the nitro compound or mixture of nitro compounds.

2. In the method of cyclizing a compound IA

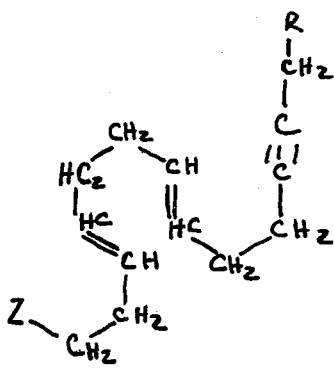

IA wherein the carbon atoms shown may be variously substituted by alkyl groups and R is selected from the class consisting of hydrogen, lower alkyl, aryl, halogen and protected hydroxyl; and Z is a cyclization initiator, to a tetracyclic product having the skeletal structure II

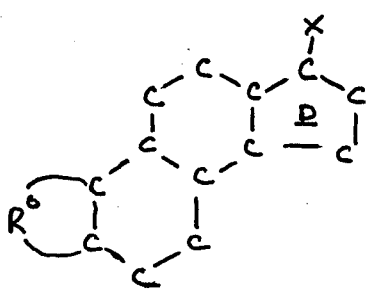

II wherein R° is derived from Z and together with the carbon atoms to which it is attached forms 5- or 6-membered carbocyclic A-ring and X is a group derived from R—CH$_2$—C≡ , the improvement which comprises conducting the cyclization reaction in a solvent which contains at least a major proportion of a primary or secondary aliphatic nitro compound, thereby forming a cyclization product II in which the D-ring has the skeletal structure III

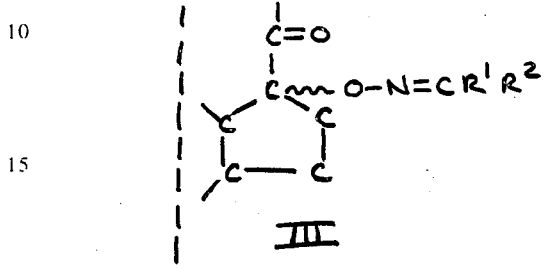

III wherein R$^1$ and R$^2$ are two monovalent groups or a single bivalent group derived from the aforesaid aliphatic nitro compound.

3. The method of claim 2 wherein IA is selected so that II is a steroid

4. The method of claim 2 followed by the step of reductive cleavage of acyl-oxime ether group of II to a glycol group IV

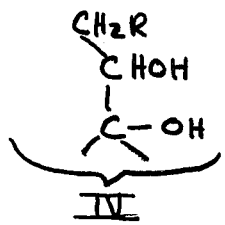

IV

5. The method of claim 1 wherein the aliphatic nitro compound is a low molecular weight nitro alkane having a primary or secondary carbon atom bonded to the nitro group.

* * * * *